US 8,443,533 B2

(12) United States Patent
Terleski et al.

(10) Patent No.: US 8,443,533 B2
(45) Date of Patent: May 21, 2013

(54) DISPLAY AND CABLE MANAGEMENT APPARATUS

(75) Inventors: Timothy W. Terleski, Garland, TX (US); Staci A. Mininger, Dallas, TX (US)

(73) Assignee: TXS Industrial Design, Inc., Richardson, TX (US)

( * ) Notice: Subject to any disclaimer, the term of this patent is extended or adjusted under 35 U.S.C. 154(b) by 1210 days.

(21) Appl. No.: 11/529,792

(22) Filed: Sep. 29, 2006

(65) Prior Publication Data

US 2008/0078109 A1  Apr. 3, 2008

(51) Int. Cl.
*G09F 3/00* (2006.01)
*G09F 3/06* (2006.01)

(52) U.S. Cl.
USPC ............................................. 40/316; 482/98

(58) Field of Classification Search
USPC ............................................. 40/316; 482/98
See application file for complete search history.

(56) References Cited

U.S. PATENT DOCUMENTS

| 6,582,346 | B1 * | 6/2003 | Lines et al. | 482/102 |
| 2005/0101182 | A1 * | 5/2005 | Nakamura et al. | 439/529 |
| 2007/0242448 | A1 * | 10/2007 | Lee et al. | 362/84 |

OTHER PUBLICATIONS www.teleadapt.com, Pull-through Access Point, 2203.*
www.icableholder.com, 4 pages.

* cited by examiner

*Primary Examiner* — Joanne Silbermann
*Assistant Examiner* — Syed A Islam

(57) ABSTRACT

An apparatus and method provide for display and cable management includes a base and a display device. The display device removably attaches to the base. When the display device is attached to the base, an aperture is created or reduced in size. The aperture allows a smaller first portion of a cable to pass through, but prevents a larger second portion of the cable from passing through. When the cable is drawn through the aperture and released, the weight of the cable retracts it through the aperture. The display device and base may include features that cooperate to resist detaching the display device when the cable is drawn through the aperture. The display device may include a graphic insert. The base may be shaped to sit on a horizontal surface and present the display device for viewing by a person standing or sitting nearby.

24 Claims, 3 Drawing Sheets

DISPLAY AND CABLE MANAGEMENT APPARATUS

TECHNICAL FIELD OF THE INVENTION

The present invention is directed, in general, to devices for cable management and, more specifically, to a device providing display capabilities and cable management.

BACKGROUND OF THE INVENTION

Some hotels offer data connections in their rooms for guests to use in connecting to the internet, or for other purposes. Some guests may have a communications cable for connecting to such data ports, but other guests may have lost or forgotten their cables. Hotels offering such data ports typically provide guests with a cable for use while staying at the hotel. However, guests may, inadvertently or deliberately, take the cable provided by the hotel when departing.

If a cable is removed from a room, the hotel must replace the cable, resulting in increased cost for operating the hotel. The cable may be replaced as part of a housekeeping service, increasing the number of tasks required to prepare a room for a new guest and complicating the work required of housekeeping staff. If the cable is not replaced before a new quest checks in, a guest requiring a communication cable may discover upon checking in that the cable is missing and be inconvenienced by having to call or visit the concierge or other hotel staff member to obtain a cable for use.

A library may similarly provide data ports for patrons of the library having their own computers to use while in the library. Likewise, a workplace offering temporary office space may provide data ports to individuals using a temporary office. Furthermore, a work station used for testing a variety of equipment may provide a plurality of electronic, hydraulic, pneumatic, or other types of cable or hose for use in testing different types of equipment.

A hotel may also want to display information to guests regarding amenities, restaurant or club facilities, or special offers available at the hotel. However, advertising flyers and informational brochures may be perceived as clutter in a hotel room, or may be moved to make room for the guest's possessions.

Likewise, a library or workplace may want to display procedures for utilizing the data port, hours of operation, or other information to patrons or individuals using temporary offices, respectively. However, there may be no suitable location for display of such information, since placards may be pushed away to make room for study materials, or signs may be inadvertently covered over.

Similarly, a user of a testing work station may benefit from the display of specifications, capacities, or safety information regarding the individual cables and hoses made available for use in testing. However, signs intended to convey such information may not make clear to which cable or hose a particular piece of information applies. Furthermore, other tools or the equipment under test may obstruct the user's view of the displayed information.

There is, therefore, a need in the art for both an improved system of cable management, as well as an improved system for presenting information.

SUMMARY OF THE INVENTION

Aspects of the invention may be found in an apparatus for display and cable management that includes a base, a cable and a display device. The cable has a first portion and an adjacent second portion and the second portion is larger than the first portion. The display device removably couples to the base. When the display device is coupled to the base, an aperture is created. The aperture is large enough to allow the first portion of the cable to pass through, but is too small to allow the second portion of the cable to pass through.

Other aspects of the invention may be found in a method of providing a display and managing a cable that includes providing a base, providing a cable, and removably coupling a display device to the base. The cable has a first portion and an adjacent second portion and the second portion is larger than the first portion. Coupling the display device to the base creates an aperture that is large enough to allow the first portion of the cable to pass through, but is too small to allow the second portion of the cable to pass through.

Additional aspects of the invention may be found in an apparatus for display and cable management that includes a base and a display device. The display device removably couples to the base. When the display device is coupled to the base, an aperture is created. The aperture is large enough to allow a smaller first portion of a cable to pass through, but is too small to allow a larger second portion of the cable to pass through.

Additional aspects of the invention may be found in an apparatus for display and cable management that includes a base and a display device. The display device removably couples to the base. The base includes an aperture having a first size large enough to allow both a smaller first portion of a cable and a larger second portion of the cable to pass through. The apparatus further includes a device that removably couples to the base and reduces the size of the aperture to a smaller second size. The second size of the aperture is large enough to allow the first portion of the cable to pass through, but is too small to allow the second portion of the cable to pass through.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF EXAMPLE EMBODIMENTS

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device. The numerous innovative teachings of the present application will be described with particular reference to the example embodiments.

Embodiments of the present invention are described in which a cable having a connector passes through an aperture in a base. The size of the aperture allows the cable to be drawn out through the aperture, but prevents the connector from passing through the aperture when the cable is retracted through the aperture. The weight of the cable causes the cable to retract through the aperture. A display device is removably attached to the base.

Figure 1:
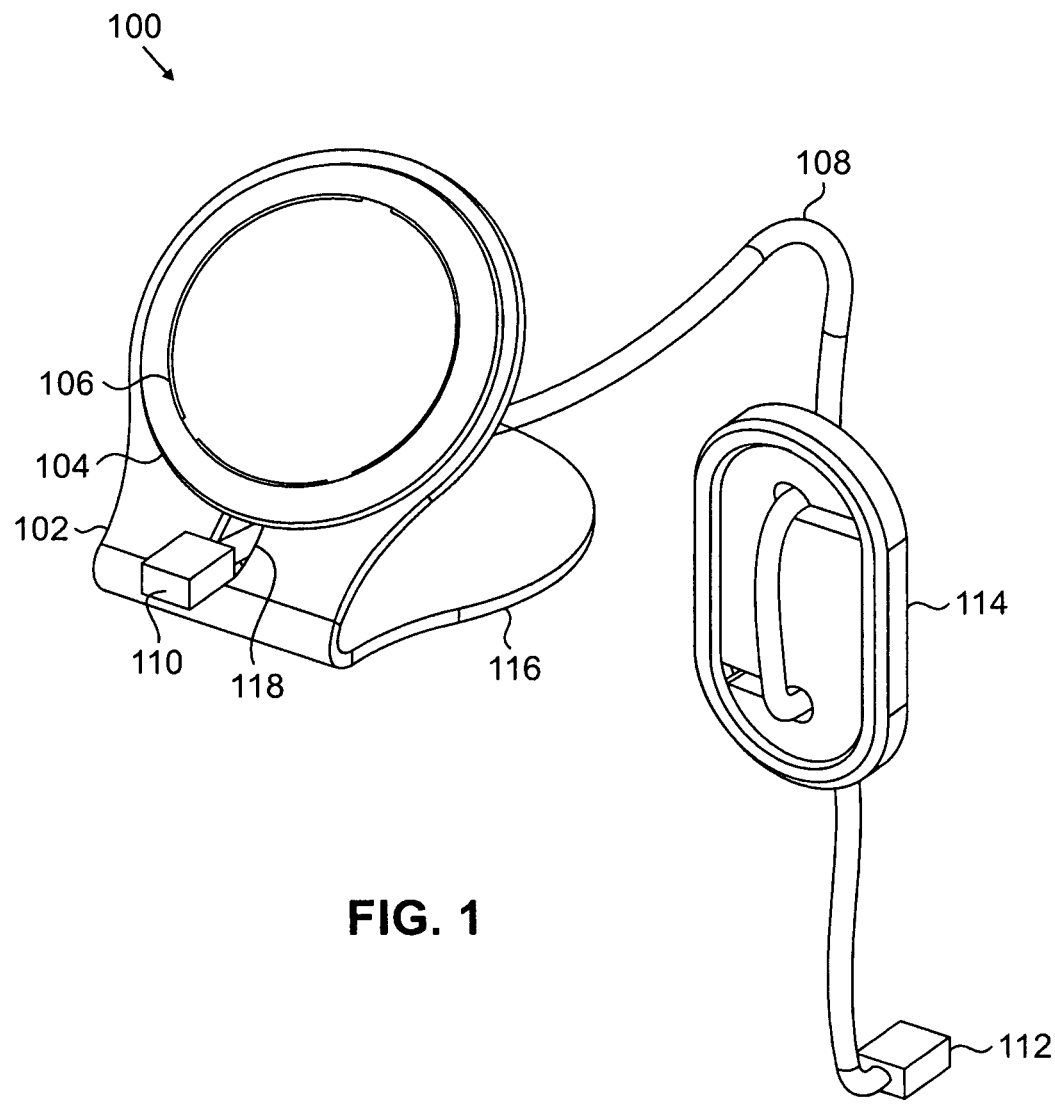
FIG. 1 depicts an orthogonal view of a display and cable management apparatus according to the present invention.

FIG. 1 depicts an orthogonal view of a display and cable management apparatus 100 according to the present invention. A display device 104 may be attached to a base 102, forming an aperture 118. A cable 108, passing through the aperture 118, may have a connector 110 at one end and a connector 112 at another end. The aperture 118 may be smaller in size than the connector 110. As a result, when the display device 104 is attached to the base 102, the cable 108 may pass through the aperture 118 but the connector 110 may be prevented from passing through the aperture 118.

The base 102 may be placed on a desk, table or other horizontal surface and the portion of the cable 108 behind the base 102 allowed to hang off the edge of the table. The connector 112 may be connected to a wall outlet. A user of the cable 108 may grasp the connector 110 and use it to draw a length of the cable 108 through the aperture 118, allowing the user to connect the cable 108 to a device. When the cable 108 is disconnected from the device and released by the user, the weight of the cable 108 may be adequate to retract substantially all of the length of the cable 108 through the aperture 118. An additional weight 114 may be attached to the cable 108 to increase the weight of the cable 108 operating to retract the cable 108 through the aperture 118.

A section 116 of the base 102 may be used as a foot when the base 102 is placed on a horizontal surface. The bottom surface of the section 116 may have a rubber pad attached to prevent the base 102 from sliding across the horizontal surface as the cable 108 passes through the aperture 118. In another embodiment of the invention, the section 116 of the base 102 may be designed with a shape that matches a protrusion, indentation, or other feature of the horizontal surface and cooperates with the feature to resist sliding of the base 102 as the cable 108 passes through the aperture 118. The base 102 may alternatively be affixed to a vertical surface by attaching the section 116 to the vertical surface with fasteners, adhesive or other method of attachment.

The cable 108 may be an electrical or electronic cable and the connectors 110 and 112 electrical connectors suitable to the cable's intended use. In other embodiments of the invention, the cable 108 may be a pneumatic or hydraulic hose and the connectors 110 and 112 connectors suitable for such use.

Furthermore, in yet other embodiments of the invention, a portion of the cable 108 at a distance from the connector 110 may be large enough to prevent the cable 108 from retracting through the aperture 118 far enough to bring the connector 110 into contact with the base 102, as is shown in FIG. 1. In this way, grasping and pulling the cable 108 through the aperture 118 may be made easier for a user. For example, such a larger portion of the cable 108 may comprise an inline connector, a section of the cable 108 with an increased diameter, or an attachment to the cable 108 having a larger size than the cable 108.

A graphic insert 106 may be attached to the display device 104. The graphic insert may display a decoration or an advertisement, a warning, a logo or other information. The information may be useful to a person using the cable 108, such as a person using a data port, a temporary office or a work bench. The information may also be of interest to a person not using the cable 108, such as a display informing a guest of a hotel of available restaurant facilities.

The display and cable management apparatus 100 may be provided to a user in kit form. The base 102 may be provided with the display device 104 inserted. The weight 114 may be provided unattached to the cable 108. The cable 108 may be provided unattached to both the base 102 and the weight 114. Indeed, in some embodiments of the invention, the base 102, the display device 104, and the weight 114 may be provided to a user without a cable 108, which is provided by the user.

Figure 2:
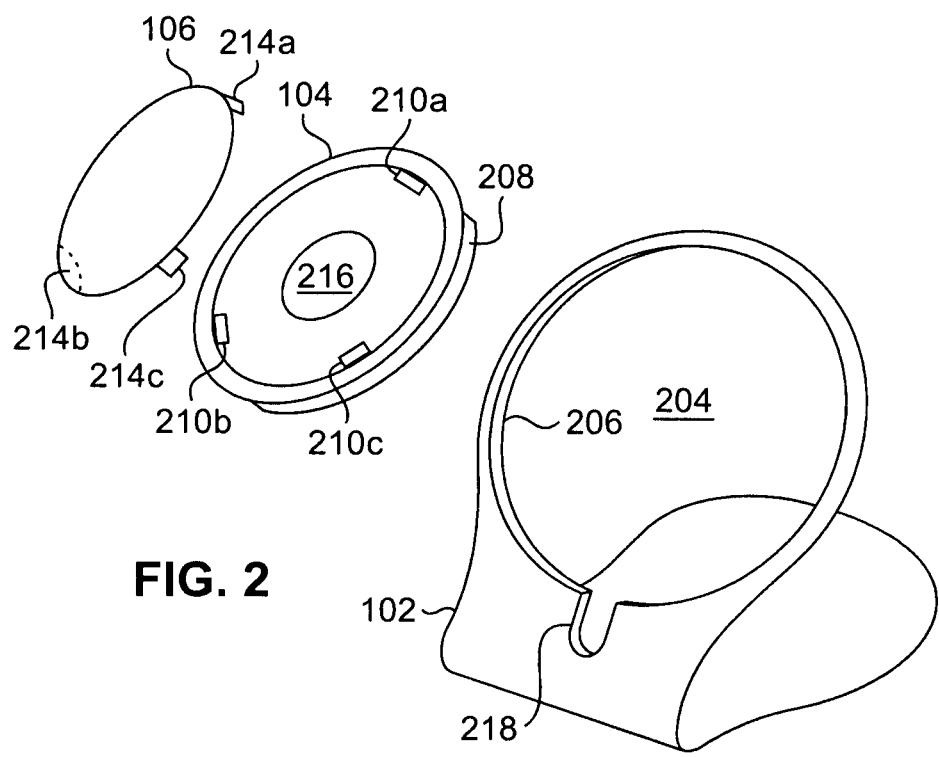
FIG. 2 shows a schematic, exploded view of the embodiment of the invention shown in FIG. 1.

FIG. 2 shows a schematic, exploded view of the embodiment of the invention shown in FIG. 1. The base 102 has an aperture 204 that includes an extension 218. When the display device 104 is inserted into the aperture 204, the extension 218 is left unfilled, forming the aperture 118 shown in FIG. 1.

The display device 104 may comprise a neck 208 with a diameter comparable to the diameter of the aperture 204. When the display device 104 is inserted into the aperture 204, the outer surface of the neck 208 may form a friction fit with the inner surface 206 of the aperture 204. The friction between the two surfaces may act to prevent the display device 104 from being pulled out of the base 102 when a user draws the cable 108 through the aperture 118.

The graphic insert 106 may comprise tabs 214a-214c and the display device 104 may comprise mounting slots 210a-210c. The tabs 214a-214c may fit into the mounting slots 210a-210c, respectively, and hold the graphic insert 106 onto the display device 104. The display device 104 may include an aperture 216 through which pressure may be applied to the graphic insert 106 to remove it from the display device 104.

Figure 3:
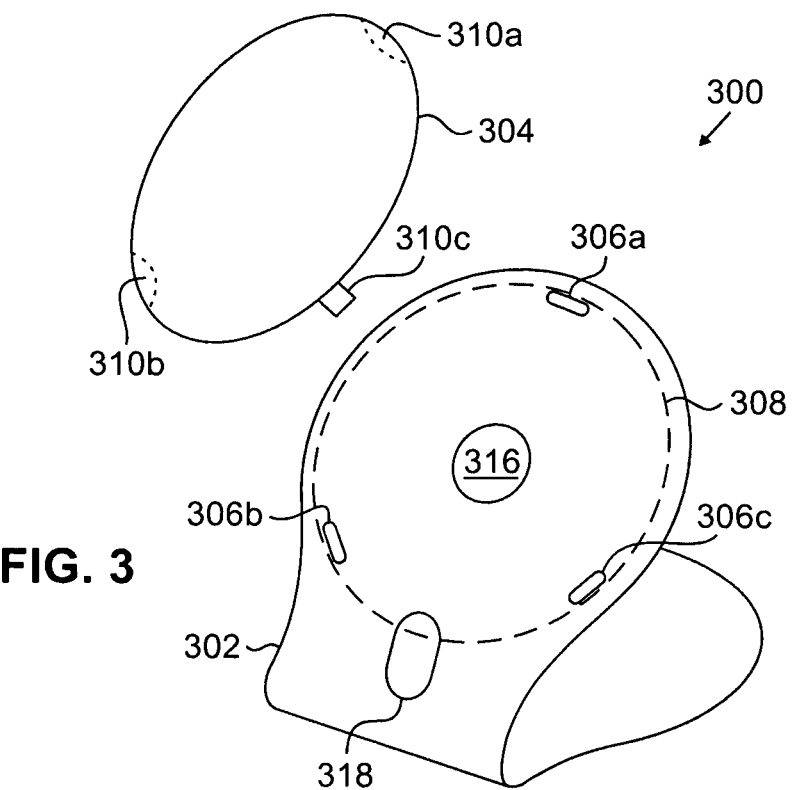
FIG. 3 illustrates an orthogonal view of a second display and cable management apparatus according to the present invention.

FIG. 3 illustrates an orthogonal view of a second display and cable management apparatus 300 according to the present invention. A display device 304 may comprise tabs 310a-310c and a base 302 may comprise mounting slots 306a-306c. The tabs 310a-310c may fit into the mounting slots 306a-306c, respectively, and hold the display device 304 onto the base 302. The base 302 may include an aperture 316 through which pressure may be applied to the display device 304 to remove it from the base 302.

The base 302 may also comprise an aperture 318 large enough to permit passage of a connector or other attachment to a cable, as described with regard to the cable 108 of FIG. 1. However, an outline 308 indicates that when the display device 304 is attached to the base 302, a size of the aperture 318 may be reduced. After attachment of the display device 304, the cable may still pass through the aperture 318 but the connector or other attachment may be too large to pass through the aperture 318.

The display device 304 may display a decoration or other information, as described for the graphic insert 106 of FIG. 1. The display device may be fabricated from plastic or other material to enable the tabs 310a-310c, inserted in the mounting holes 306a-306c, respectively, to act to resist the display device 304 being dislodged as a cable is drawn through the aperture 318.

Figure 4:
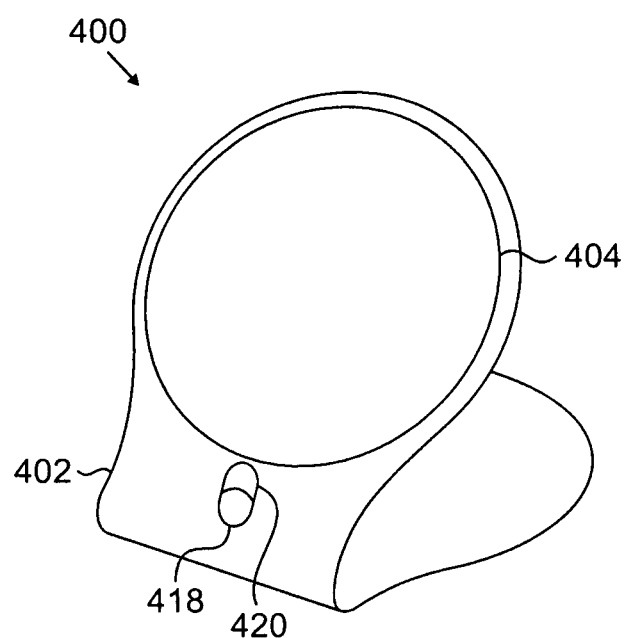
FIG. 4 presents an orthogonal view of a third display and cable management apparatus according to the present invention.

FIG. 4 presents an orthogonal view of a third display and cable management apparatus 400 according to the present invention. A base 402 includes an aperture 418. A plug 420 may be installed in a portion of the aperture 418 to reduce a size of the aperture 418. When the plug 420 is removed from the aperture 418, the aperture 418 may be large enough to permit passage of a connector or other attachment to a cable, as described with regard to FIGS. 1 and 3. When the plug 420 is installed in the aperture 418, the size of the aperture 418 may be reduced such that the cable may still pass through the aperture 418 but the connector or other attachment may be too large to pass through the aperture 418.

A display device 404 may be attached to the base 402. However, in the embodiment of the invention shown in FIG. 4, the display device 404 does not act to create the aperture 418 or change its size.

While the bases and display devices of the embodiments of the present invention shown in FIGS. 1-4 are generally round, it will be understood that a base and display device of an apparatus for display and cable management according to the present invention may have any desired shape. Similarly, while the display devices of FIGS. 1-4 are shown as inserting into an aperture of a base or mounting onto a planar surface of a base, it will be understood that an apparatus for display and cable management according to the present invention may comprise a display device and a base that attach along outer edges, with a cutout in one or both of the display device and the base acting to form an aperture through which a cable may pass.

While the present invention has been described in detail with respect to certain embodiments thereof, those skilled in the art should understand that various changes, substitutions, modifications, alterations, and adaptations in the present invention may be made without departing from the concept and scope of the invention in its broadest form.

What is claimed is:

1. An apparatus for display and cable management, comprising:
   a base having an aperture, wherein the aperture includes a first portion and a second portion;
   a cable having a first portion and an adjacent second portion, the first portion of the cable having a first size and the second portion of the cable having a second size, the second size being larger than the first size; and
   a display device removably coupled to the base,
   wherein
      the display device is adapted to couple to, and decouple from, the base without the use of a tool, and
      when the display device is coupled to the base, the display device fills the first portion of the aperture, leaving unfilled the second portion of the aperture, the second portion of the aperture having a size that allows the first portion of the cable to pass through the second portion of the aperture and prevents the second portion of the cable from passing through the second portion of the aperture.

2. The apparatus of claim 1, wherein when a first length of the cable is drawn through the second portion of the aperture and the cable is released, a weight of the cable retracts a second length of the cable back through the second portion of the aperture.

3. The apparatus of claim 2, wherein the cable further comprises an attachment that increases the weight of the cable.

4. The apparatus of claim 1, wherein
the base further comprises a first feature and
the display device further comprises a second feature operable to couple to the first feature,
wherein the first feature and the second feature cooperate to resist decoupling of the display device from the base.

5. The apparatus of claim 1, wherein the display device is adapted to couple to the base with sufficient friction to resist decoupling of the display device from the base.

6. The apparatus of claim 1, wherein the display device further comprises a graphic insert removably coupled to the display device.

7. The apparatus of claim 6, wherein the display device further comprises a first feature and the graphic insert further comprises a second feature, wherein the first feature and second feature cooperate to resist decoupling of the graphic insert from the display device.

8. The apparatus of claim 1, wherein the base is adapted to be placed upon a horizontal surface and to position the display device at an angle that permits viewing of the display device by a person who is one of standing and sitting near the horizontal surface.

9. The apparatus of claim 8, wherein the base is adapted to resist motion of the base on the horizontal surface.

10. A method of providing a display and managing a cable, comprising:
   providing a base having an aperture, wherein the aperture includes a first portion and a second portion;
   providing a cable having a first portion and an adjacent second portion, the first portion of the cable having a first size and the second portion of the cable having a second size, the second size being larger than the first size; and
   removably coupling a display device to the base without using a tool,
   wherein the display device is adapted to decouple from the base without using a tool and coupling the display device to the base fills the first portion of the aperture, leaving unfilled the second portion of the aperture, the second portion of the aperture having a size that allows the first portion of the cable to pass through the second portion of the aperture and prevents the second portion of the cable from passing through the second portion of the aperture.

11. The method of claim 10, further comprising attaching a weight to the cable to assist in retracting the cable back through the aperture when a length of the cable is drawn through the second portion of the aperture and the cable is released.

12. The method of claim 10, wherein the step of removably coupling the display device to the base further comprises coupling a first feature of the base to a second feature of the display device, wherein the first feature and the second feature cooperate to resist decoupling of the display device from the base.

13. The method of claim 10, wherein the display device is adapted to couple to the base with sufficient friction to resist decoupling of the display device from the base.

14. The method of claim 10, further comprising removably coupling a graphic insert to the display device.

15. The method of claim 14, wherein the step of removably coupling the graphic insert to the display device further comprises coupling a first feature of the graphic insert to a second feature of the display device, wherein the first feature and second feature cooperate to resist decoupling of the graphic insert from the display device.

16. The method of claim 10, wherein the base is adapted to be placed upon a horizontal surface and to position the display device at an angle that permits viewing of the display device by a person who is one of standing and sitting near the horizontal surface.

17. The method of claim 16, wherein the base is adapted to resist motion of the base on the horizontal surface.

18. An apparatus for display and cable management, comprising:
- a base having an aperture, wherein the aperture includes a first portion and a second portion;
- a display device removably coupled to the base; and
- a device adapted to couple to a cable,
wherein
- when the display device is coupled to the base, the display device fills the first portion of the aperture, leaving unfilled the second portion of the aperture, the second portion of the aperture having a size that allows a first portion of the cable to pass through the second portion of the aperture and prevents an adjacent second portion of the cable from passing through the second portion of the aperture, the first portion of the cable having a size smaller than a size of the second portion of the cable,
- the display device is adapted to couple to, and decouple from, the base without the use of a tool, and
- when the device is coupled to a cable passing through the second portion of the aperture and a first length of the cable is drawn through the second portion of the aperture, a weight of the device causes a second length of cable to be retracted back through the second portion of the aperture when the cable is released.

19. The apparatus of claim 18, wherein
the base further comprises a first feature and
the display device further comprises a second feature operable to couple to the first feature,
wherein the first feature and the second feature cooperate to resist decoupling of the display device from the base.

20. The apparatus of claim 18, wherein the display device is adapted to couple to the base with sufficient friction to resist decoupling of the display device from the base.

21. The apparatus of claim 18, wherein the display device further comprises a graphic insert removably coupled to the display device.

22. The apparatus of claim 21, wherein the display device further comprises a first feature and the graphic insert further comprises a second feature, wherein the first feature and second feature cooperate to resist decoupling of the graphic insert from the display device.

23. The apparatus of claim 18, wherein the base is adapted to be placed upon a horizontal surface and to position the display device at an angle that permits viewing of the display device by a person who is one of standing and sitting near the horizontal surface.

24. The apparatus of claim 23, wherein the base is adapted to resist motion of the base on the horizontal surface.

* * * * *